US008693750B2

(12) United States Patent
Wels et al.

(10) Patent No.: US 8,693,750 B2
(45) Date of Patent: Apr. 8, 2014

(54) METHOD AND SYSTEM FOR AUTOMATIC DETECTION OF SPINAL BONE LESIONS IN 3D MEDICAL IMAGE DATA

(75) Inventors: Michael Wels, Bamberg (DE); Michael Suehling, Erlangen (DE); Shaohua Kevin Zhou, Plainsboro, NJ (US); David Liu, Princeton, NJ (US); Dijia Wu, North Brunswick, NJ (US); Christopher V. Alvino, Allenwood, NJ (US); Michael Kelm, Erlangen (DE); Grzegorz Soza, Heroldsberg (DE); Dorin Comaniciu, Princeton Junction, NJ (US)

(73) Assignee: Siemens Aktiengesellschaft, München (DE)

( * ) Notice: Subject to any disclaimer, the term of this patent is extended or adjusted under 35 U.S.C. 154(b) by 248 days.

(21) Appl. No.: 13/342,248

(22) Filed: Jan. 3, 2012

(65) Prior Publication Data
US 2012/0183193 A1 Jul. 19, 2012

Related U.S. Application Data

(60) Provisional application No. 61/432,612, filed on Jan. 14, 2011.

(51) Int. Cl.
*G06K 9/00* (2006.01)
*G06K 9/46* (2006.01)
*G06K 9/62* (2006.01)
*G06K 9/68* (2006.01)
*G06K 9/70* (2006.01)

(52) U.S. Cl.
USPC ........... 382/128; 382/131; 382/132; 382/133; 382/181; 382/190; 382/203; 382/224; 382/225; 382/226; 382/227

(58) Field of Classification Search
CPC .................................. G06K 9/00; G06K 9/62
USPC .................................. 382/128, 131, 132, 133
See application file for complete search history.

(56) References Cited

U.S. PATENT DOCUMENTS

| | | | | |
|---|---|---|---|---|
| 5,123,054 A | * | 6/1992 | Hara et al. ..................... | 382/130 |
| 7,088,850 B2 | * | 8/2006 | Wei et al. ...................... | 382/128 |
| 7,379,572 B2 | * | 5/2008 | Yoshida et al. ............... | 382/128 |
| 7,561,728 B2 | | 7/2009 | Abufadel et al. | |
| 7,747,056 B2 | * | 6/2010 | Suzuki et al. ................. | 382/131 |
| 2004/0068187 A1 | * | 4/2004 | Krause et al. ................. | 600/443 |
| 2004/0147830 A1 | * | 7/2004 | Parker et al. .................. | 600/407 |

(Continued)

OTHER PUBLICATIONS

L. Antiga, "Generalizing Vesselness with Respect to Dimensionality and Shape", The Insight Journal (2007).

*Primary Examiner* — Matthew Bella
*Assistant Examiner* — Jose M Torres
(74) *Attorney, Agent, or Firm* — Michele L. Conover (57) ABSTRACT

A method and system for automatic detection and volumetric quantification of bone lesions in 3D medical images, such as 3D computed tomography (CT) volumes, is disclosed. Regions of interest corresponding to bone regions are detected in a 3D medical image. Bone lesions are detected in the regions of interest using a cascade of trained detectors. The cascade of trained detectors automatically detects lesion centers and then estimates lesion size in all three spatial axes. A hierarchical multi-scale approach is used to detect bone lesions using a cascade of detectors on multiple levels of a resolution pyramid of the 3D medical image.

32 Claims, 6 Drawing Sheets

(56) References Cited

U.S. PATENT DOCUMENTS

| | | |
|---|---|---|
| 2006/0245629 A1* | 11/2006 | Huo et al. .................... 382/131 |
| 2007/0053563 A1* | 3/2007 | Tu et al. ...................... 382/128 |
| 2007/0081713 A1* | 4/2007 | Jerebko ....................... 382/128 |
| 2007/0223799 A1* | 9/2007 | Weiss .......................... 382/131 |
| 2008/0044074 A1 | 2/2008 | Jerebko et al. |
| 2008/0049999 A1* | 2/2008 | Jerebko et al. ............... 382/128 |
| 2008/0071711 A1* | 3/2008 | Zhang et al. ................. 706/20 |
| 2008/0137928 A1 | 6/2008 | Shen et al. |
| 2011/0007954 A1* | 1/2011 | Suehling et al. ............. 382/128 |
| 2011/0058720 A1 | 3/2011 | Lu et al. |
| 2011/0222751 A1 | 9/2011 | Barbu et al. |

* cited by examiner

METHOD AND SYSTEM FOR AUTOMATIC DETECTION OF SPINAL BONE LESIONS IN 3D MEDICAL IMAGE DATA

This application claims the benefit of U.S. Provisional Application No. 61/432,612, filed Jan. 14, 2011, the disclosure of which is herein incorporated by reference.

BACKGROUND OF THE INVENTION

The present invention relates to detection of bone lesions in medical images, and more particularly, to automatic detection and volumetric quantification of spinal bone lesions in 3D medical images.

Detection and volumetric quantification of spinal bone lesions is important in the treatment of metastizing cancer. Spinal bone lesions may cause debilitating pain, pathologic fractures, and spinal cord compression with sever neurological impairment. In addition to assessing risks of certain courses of the disease, detection and volumetric quantification of bone lesions is important for accurate quantification of disease progression or response to therapy. However, reading an manually identifying and volumetrically measuring, i.e. annotating, spinal bone lesions from 3D computed tomography (CT) data is a challenging and labor intensive task, even for expert radiologists. Further, there may be significant inter- and intra-user variability among manual bone lesion annotations. Accordingly, automated detection and volumetric quantification of spinal bone lesions is desirable.

BRIEF SUMMARY OF THE INVENTION

The present invention provides a method and system for automatic detection and volumetric quantification of bone lesions in 3D medical images. Embodiments of the present invention utilize a series of detectors arranged in a cascade to automatically detect lesion centers and then estimate lesion size in all three spatial dimensions. Embodiments of the present invention utilize a hierarchical multi-scale approach by applying the cascade of detectors to multiple resolution pyramid levels.

In one embodiment of the present invention, one or more regions of interest corresponding to bone regions are detected in a 3D medical image. Bone lesions are detected in the one or more regions of interest using a cascade of trained detectors. The cascade of trained detectors may include one or more translation detectors to detect position bone lesion center candidates and a lesion scale detector to detect bone lesion candidates that are 3D bounding boxes centered at the detected bone lesion center candidates. The bone lesion candidates may be clustered to combine detected bone lesion candidates that are spatially close together. The bone lesions may be detected on a plurality of levels of a resolution pyramid of the 3D image using a respective cascade of detectors trained at each resolution level.

These and other advantages of the invention will be apparent to those of ordinary skill in the art by reference to the following detailed description and the accompanying drawings.

DETAILED DESCRIPTION

The present invention is directed to a method and system for automatic detection and volumetric quantification of bone lesions in medical images, such as computed tomography (CT), magnetic resonance (MR) images, etc. Embodiments of the present invention are described herein to give a visual understanding of the bone lesion detection method. A digital image is often composed of digital representations of one or more objects (or shapes). The digital representation of an object is often described herein in terms of identifying and manipulating the objects. Such manipulations are virtual manipulations accomplished in the memory or other circuitry/hardware of a computer system. Accordingly, it is to be understood that embodiments of the present invention may be performed within a computer system using data stored within the computer system.

Embodiments of the present invention provide fully automatic detection and volumetric measurements of bone lesions in 3D medical image data. In particular embodiments described herein, spinal bone lesions are detected in 3D computed tomography (CT), but the present invention can be similarly applied to other types of bone lesions and to other types of medical imaging modalities. Embodiments of the present invention provide relatively fast detection (e.g., less than one minute), and are able to cope with various types of data including less and more severe pathological cases.

In advantageous embodiments for automatic detection and volumetric quantification of bone lesions in 3D medical image data, a pre-processing step automatically detects individual vertebral bodies or other bone regions to define a region of interest for bone lesion detection. A hierarchical multi-scale approach is adopted to apply the bone lesion detection to multiple resolution pyramid levels. On each resolution pyramid level, a cascade of multiple machine learning-based detectors, each relying on different features or cues extracted from the image, is used for automatically detecting bone lesions. In one embodiment, five detectors are used in the cascade: four detectors to successively narrow the range of possible lesion centers from all candidate voxels in the region of interest, and the fifth detector to enrich the object representation by axis-aligned scale information and to further narrow the number of candidates in the spirit of Marginal Space Learning (MSL). The remaining candidates are finally grouped together through hierarchical agglomerative clustering as candidates close to each other are likely to represent the same bone lesion. Clustering is also used to incrementally integrate the results obtained from individual resolution pyramid levels. Once the lesions are detected, well-known segmentation techniques can be used to exactly delineate the detected bone lesions.

Embodiments of the present invention provide fully automatic accurate detection and volumetric quantification of bone lesions and can be used in various medical applications, including but not limited to: initial assessment of cancerous metastasization; monitoring of disease progress and response to therapy over time; optimizing clinical workflow in drawing attention to suspicious regions; and decreasing inter- and intra-observer variance on reported bone lesion findings.

Embodiments of the present invention do not impose a restriction on the size of potential lesion candidates. Further, embodiments of the present invention utilize a framework that is entirely machine-learning based and can be conceptually trained to detect any suspicious abnormalities, provided that there is sufficient evidence within the image data and the derived features to characterize the abnormal image entities are searched for, and the ambiguities between true positive and true negative abnormality candidates are not too large. The abnormalities may be found in different bone regions, and the pre-processing step of detecting the spine (described below) may be replaced by another method for detecting another bone region of interest, such as the spinal and transverse processes of the vertebrae. Alternatively, more sophisticated segmentation algorithms may be used for further and/or better restriction of those regions. Accordingly, various embodiments of the present invention are capable of detecting various categories of bone abnormalities within different regions of interest. Depending on the implementation, the type of the detected abnormalities (e.g., osteoblastic lesions, osteolytic lesions, ostreophytes, etc.) and their relative location with regard to the region of interest can be automatically specified.

Figure 1:
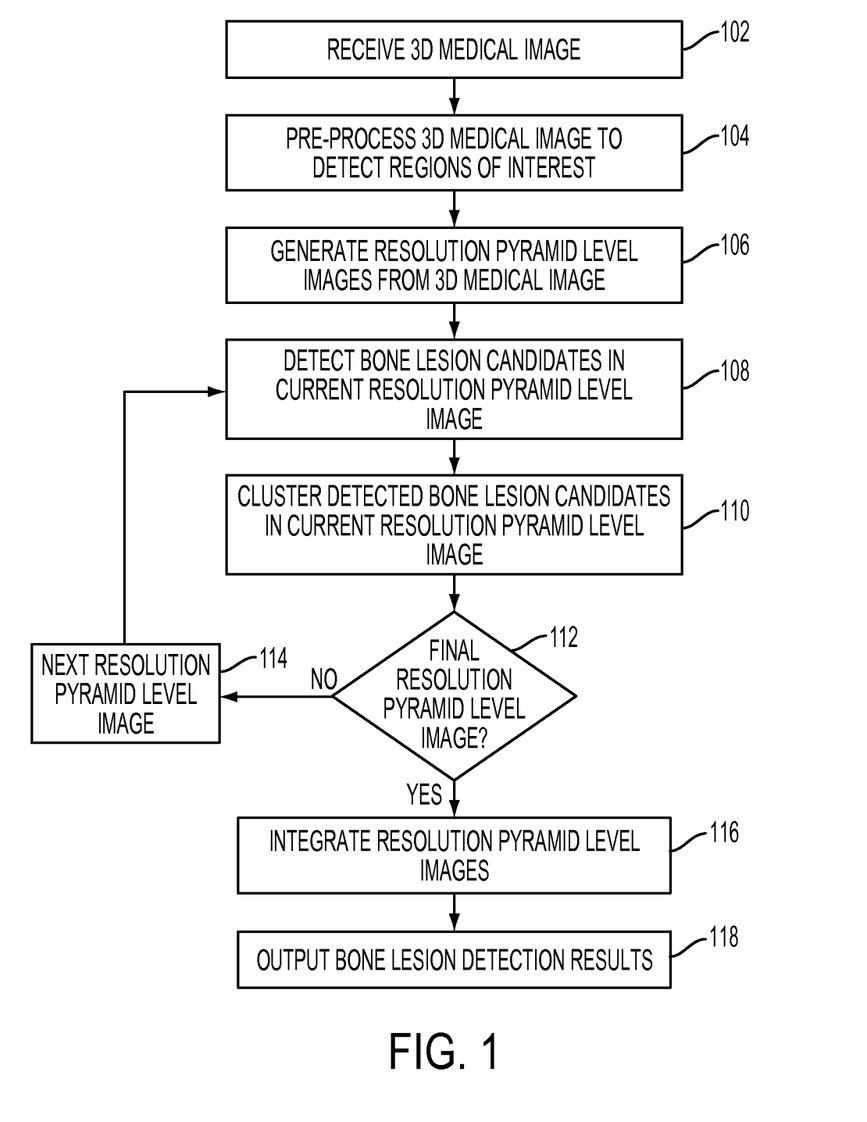
FIG. 1 illustrates a method for automatic bone lesion detection in a 3D medical image according to an embodiment of the present invention.

FIG. 1 illustrates a method for automatic bone lesion detection in a 3D medical image according to an embodiment of the present invention. The method of FIG. 1 is described herein using the example of spinal bone lesion detection in a 3D CT volume, but it is to be understood that the method may be similarly implemented to detect other types of bone lesions and in other types of imaging modalities.

Referring to FIG. 1, at step 102, a 3D medical image volume is received. In one embodiment, the medical image volume is a 3D CT volume, but the present invention is not limited thereto and the medical image volume may be generated using other types of imaging modalities, such as MR. The 3D medical image volume may be received directly from an image acquisition device, such as and CT scanner. It is also possible that the 3D medical image can be received by loading a previously acquired image from a memory or storage of a computer system.

At step 104, the 3D medical image is pre-processed to detect one or more regions of interest in the 3D medical image. In particular, the regions of interest are target bone regions that are automatically detected in the 3D medical image. For spine bone lesion detection, the regions of interest detected by automatically detecting individual vertebrae in the 3D medical image, each detected individual vertebra defining a region of interest. The automatic vertebrae detection can be performed by any automatic vertebrae detection algorithm. Examples of such as vertebrae detection algorithms are described in United States Published Patent Application No. 2011/0058720, United States Published Patent Application No. 2008/0044074, U.S. Pat. No. 7,561,728, and United States Published Patent Application No. 2008/0137928, the disclosures of which are incorporated herein by reference.

Figure 2A:
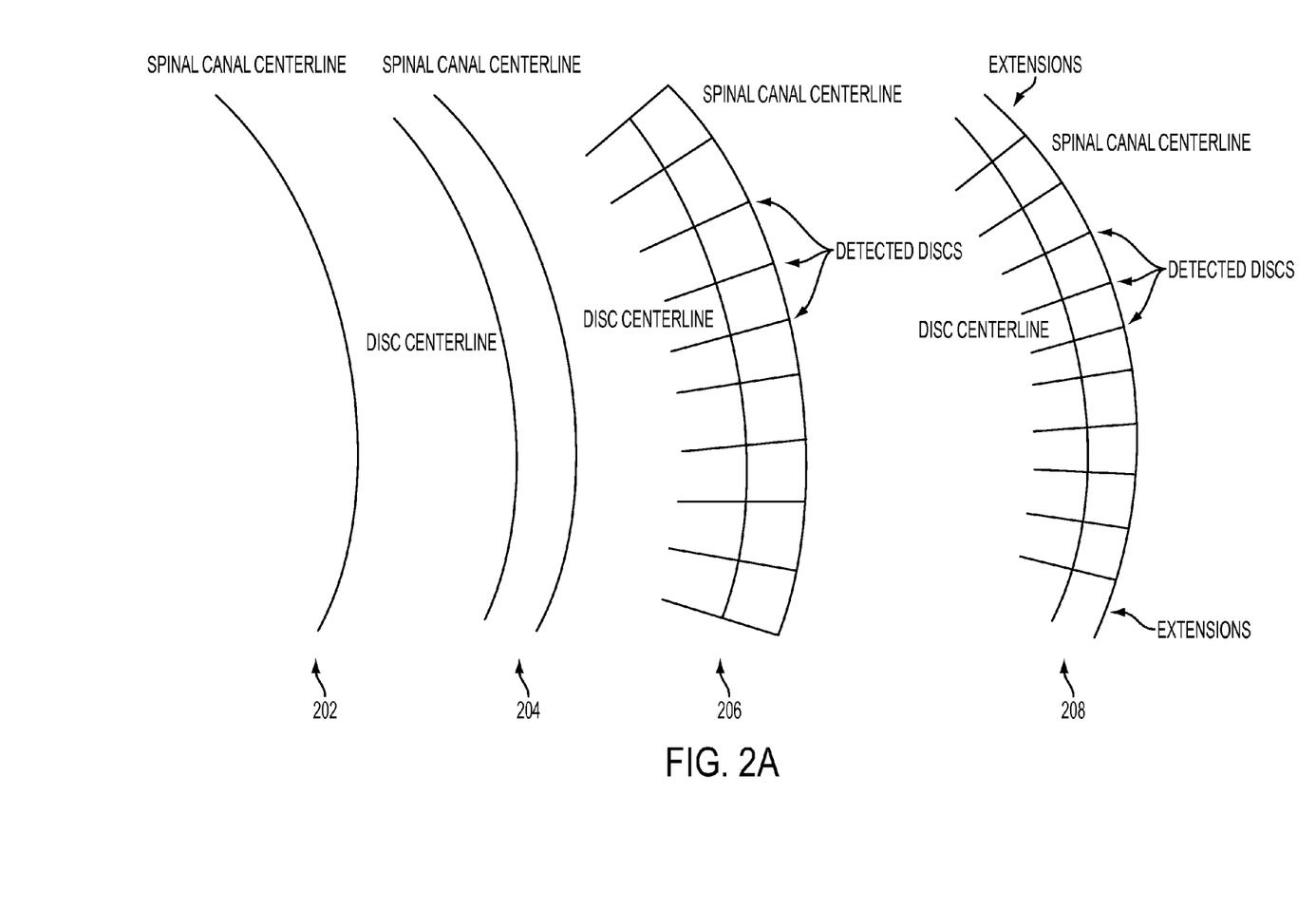
FIGS. 2A and 2B illustrate an exemplary algorithm for automatic vertebrae detection in a 3D medical image.
Figure 2B:
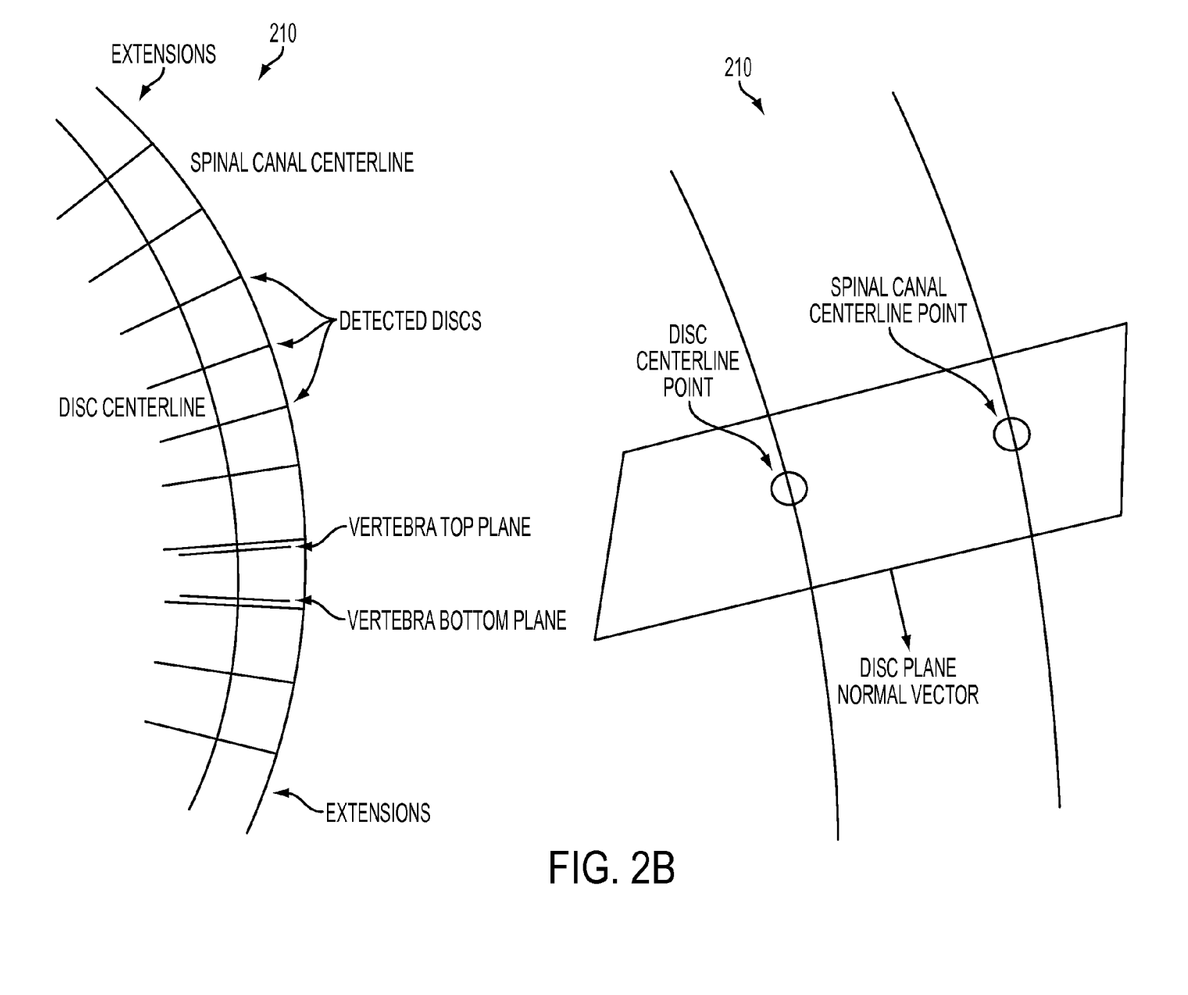

FIGS. 2A and 2B illustrate an exemplary algorithm for automatic vertebrae detection in a 3D medical image. The algorithm illustrated in FIGS. 2A and 2B can be used to implement step 104 of the method of FIG. 1 in order to detect the regions of interest in the 3D medical image. This algorithm takes a 3D medical image, such as a 3D CT volume, as input. Referring to FIG. 2A, at 202, a spinal canal centerline is detected in the 3D medical image. At 204, a disc centerline is detected based on the location of the spinal canal centerline. The disc centerline is an estimated centerline through the center points of the intervertebral discs. At 206, the individual intervertebral discs are detected in the 3D medical image and the spinal canal and disc centerlines are trimmed above the highest detected disc and below the lowest detected disk. At 208, extensions are added to the spinal canal and disc centerlines to account for vertebrae above the highest detected disc and below the lowest detected disc. Referring to FIG. 2B, at 210, each disc is refined and the positions of the vertebra bottom planes (above each disc) and the vertebra top planes (below each disc) are estimated. The orientations of the vertebra top and bottom planes can then be refined. The top and bottom vertebral planes inherit the normal vector of the disc plane of the adjacent disc. The exact position on the disc centerline and the spinal cord centerline is then determined for each disc, vertebra top plane, and vertebra bottom plane. Also, the index (with sub point accuracy) along these centerlines is calculated for each disc, for each vertebra top plane, and for each vertebra bottom plane. The vertebra top and bottom planes between a pair of adjacent discs define a vertebra, which can be used as a region of interest for spinal bone lesion detection.

After the detection of the vertebral bodies and the spinal discs, the vertebral bodies and the spinal discs can be labeled according to the common anatomical convention (C1-C7, T1-T12, L1-L5) beginning with the vertebra detected most caudally. Accordingly, the detected lesion locations can be output both in absolute coordinates within the image, as well as in terms of spatial qualifiers relative to the surrounding vertebral body. For example, a detected bone lesion may be identified as "one osteoblastic bone lesion of size 1.5×1.5×1.5 $cm^3$ in the dorsal region of the body of the first lumbar vertebra."

Returning to FIG. 1, at step 106, resolution pyramid images are generated from the 3D medical image. In particular, one or more reduced resolution images are generated from the 3D medical image resulting in a resolution pyramid. The original image and the reduced resolution images each correspond to a different resolution pyramid level. The reduced resolution levels of the pyramid are themselves obtained through an iterative algorithm. The bottom, or zero level of the pyramid, is equal to the original image. The original image is low-pass filtered or band-pass filtered and sub-sampled by a factor of two to obtain the next pyramid level image. This reduced resolution image is then filtered in the same way and sub-sampled to obtain a next pyramid level image. Further repetitions of the filtering and sub-sampling steps can be used to generate additional pyramid level images. The detection of bone lesions at multiple resolution pyramid levels provides accurate detection of bone lesions having large variations in scale.

At step 108, bone lesion candidates are detected in the regions of interest in the current resolution pyramid level image using a cascade of trained detectors. In an advantageous embodiment for spinal bone lesion detection, a cascade of five detectors is used to narrow the range of possible lesion candidates during translation and scale detection. All of the detectors are trained from annotated training data in a bootstrapping matter. In particular, a first classifier can be trained using the complete set of training data (except for negative sub-sampling and security margins between positive and negative samples), i.e., all true positive annotations and all true negative annotations. The first classifier is then applied to the training data, and training data classified by the first classifier as positive is used for training the next classifier. According to an advantageous implementation, a multi-scale detection approach is used and training data is generated from the training data set at multiple resolution scales. Accordingly, it is ensured that positive training samples, i.e., true lesion annotations, contribute to the training data at normalized scale levels. That is, positive training samples generated from large lesions are taken from coarser resolutions and small lesion samples are taken from finer resolutions. By doing so, the intra-class variance of true bone lesions is decreased resulting in less training data being necessary to train the detectors.

Figure 3:
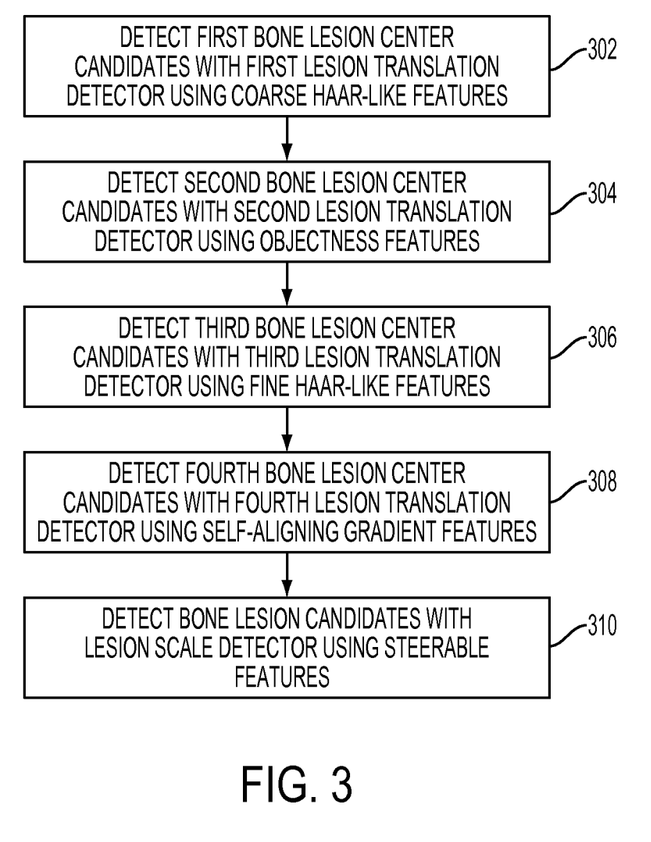
FIG. 3 illustrates a method of spinal bone lesion detection using a cascade of detectors according to an embodiment of the present invention.
Figure 4A:
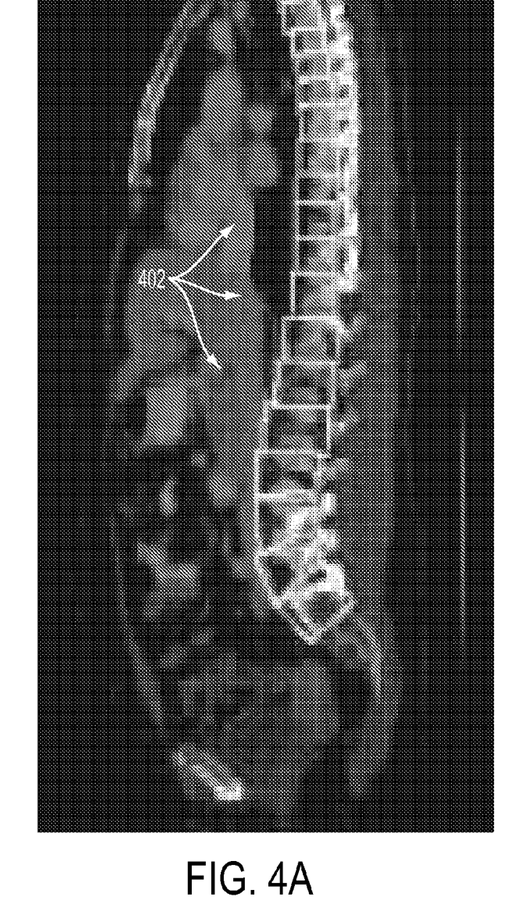
FIG. 4 illustrates exemplary bone lesion detection results obtained using cascade detection and clustering.
Figure 4B:
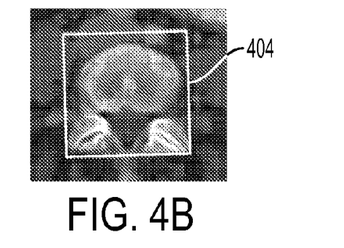
Figure 4C:
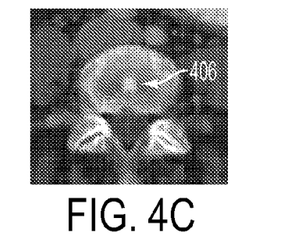
Figure 4D:
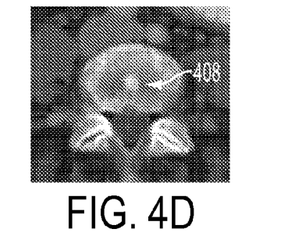
Figure 4E:
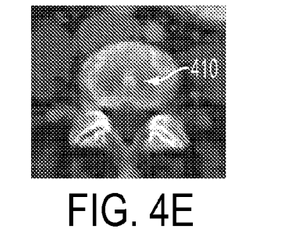
Figure 4F:
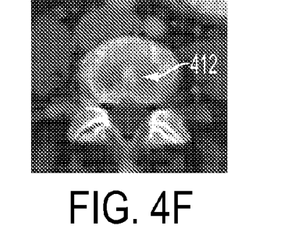

FIG. 3 illustrates a method of spinal bone lesion detection using a cascade of detectors according to an embodiment of the present invention. It is to be understood that the method of FIG. 3 can be used to implement step 108 of the method of FIG. 1. Each step of the method of FIG. 3 corresponds to a different trained detector, and the detectors are arranged in a cascade such that only positive detection results from each step are passed to the next step. For each cascade step boosted ensembles of weak classifiers can be used as the machine-learning component for the classification task at hand, i.e., bone lesion vs. non-bone lesion. For example, each cascade step can be implemented as detector trained using probabilistic boosting tree (PBT). The pool of weak classifiers varies from step to step to draw attention of the learning-based components to specific characteristics of bone lesions. In the process of boosting only a relatively small number of features are selected from the much larger pool of features available such that the classification of a new lesion candidate in the detection stage can be computed efficiently. All used features are designed to consider 3-D contexts surrounding the center of the detection candidate to be examined. This way, macroscopic morphological information is taken into account for spinal bone lesion detection. Each of the trained classifiers calculates a probability score for the sample being tested and classifies the sample as positive if the probability score is above a certain threshold.

As illustrated in FIG. 3, at step 302, a first set of lesion center candidates are detected in each region of interest by a first lesion translation detector using coarse 3D Haar-like features. The coarse 3D Haar-like features are extracted for each voxel in the regions of interest and the first lesion translation detector classifies each voxel in the regions of interest as positive (bone lesion) or negative (non-bone lesion) based on the extracted features for that voxel. 3D Haar-like features are described in greater detail in Tu et al., "Probabilistic 3D Polyp Detection in CT Images: The Role of Sample Alignment", CVPR 2006, which is incorporated herein by reference. The 3D Haar-like features have a parameter that controls the size of the features in the feature set, and the coarse 3D Haar-like features can be generated by setting this parameter to result in relatively coarse coverage of a neighborhood surrounding each voxel, as is understood by one of ordinary skill in the art. The first set of bone lesion center candidates (i.e., the voxels classified as positive by the first detector) are passed to the next detector of step 304.

At step 304, a second set of lesion center candidates are detected from the first set of lesion center candidates by a second lesion translation detector using objectness features. The objectness feature is a measurement of how much the neighborhood surrounding each voxel resembles the target object (i.e., a bone lesion). Bone lesions can be represented as a blob-like object, and the objectness feature can be calculated using elements of a Hessian matrix, which is based on second-order derivatives of the image at a point. The sign and magnitude of the eigenvalues of the matrix are used to produce a numerical description of the objectness (i.e., blob-like shape) at each voxel. Additional details on such objectness features are described in L. Antiga, "Generalizing Vesselness with Respect to Dimensionality and Shape", *The Insight Journal* (2007), which is incorporated herein by reference. The second lesion translation detector classifies each voxel of the first set of bone lesion center candidates as positive (bone lesion) or negative (non-bone lesion) based on the respective objectness features of the voxels. The voxels classified as positive by the second lesion translation detector are the second set of bone lesion candidates, and are passed to the next detector of step 306.

At step 306, a third set of lesion center candidates are detected from the second set of lesion center candidates by a third lesion translation detector using fine 3-D Haar-like features. As described above, 3D Haar-like features have a parameter that controls the size of the features in the feature set. The fine 3D Haar-like features can be generated by setting this parameter to result in relatively fine coverage of a small neighborhood surrounding each voxel, as is understood by one of ordinary skill in the art. While the actual parameter specifying the coarseness or fineness of the 3D Haar-like features used by the detectors in steps 302 and 306 can be set by one of ordinary skill in the art, it is to be understood that the first lesion translation detector in step 302 uses a first set of Haar-like features and the third set of Haar-like features detector in step 306 uses a second set of Haar-like features having a smaller (finer) scale than the first set of Haar-like features. The third lesion translation detector classifies each voxel of the second set of bone lesion center candidates as positive (bone lesion) or negative (non-bone lesion) based on the fine 3D-Haar like features of the voxels. The voxels classified as positive by the third lesion translation detector are the third set of bone lesion candidates, and are passed to the next detector of step 308.

At step 308, a fourth set of lesion center candidates are detected from the third set of lesion center candidates using self-aligning features that self-align to high gradients in the image. The self-aligning features are not extracted at a particular fixed location with respect to each voxel, but extracted at a location that varies according to the gradient in the neighborhood of each voxel. Accordingly, the self-aligning features can be used to accurately detect bone lesions independently of the size of the bone lesions detected. The self-aligning features are calculated along a predetermined number of directions from a candidate location. In an advantageous implementation, the self-aligning features can be calculated along rays in 14 directions in 3D space from each candidate location. These 14 directions are ($\pm 1,0,0$), ($0,\pm 1,0$), ($0,0,\pm 1$), and ($\pm 1,\pm 1,\pm 1$). In an exemplary embodiment, in each direction $d_i$, $1 \le i \le 14$, local maxima of the gradient above each of 10 thresholds $\tau_j = 10j$, $1 \le j \le 10$, can be found at each of three scales $s_k = \frac{1}{2}^k$, $1 \le k \le 3$, and features can be extracted at the determined local maxima locations. For each of the 14 directions, such local gradient maxima locations can be determined for each of 10 thresholds at each of 3 scales, and features can be extracted at the determined local maxima locations. According to an advantageous implementation, the following features can be extracted:

- Each of the 24 local features (e.g., gradient magnitude, angle, intensity value, etc.) described in Y. Zheng et al., "Four-Chamber Heart Modeling and Automatic Segmentation for 3D Cardiac CT Volumes Using Marginal Space Learning and Steerable Features", *IEEE TMI*, 27(11), 2008, which is incorporated herein by reference, at each of the first three local maxima locations for each $d_i$, $\tau_j$, and $s_k$.
- Each of the 24 local features calculated half way between the candidate location and each of the first three local maxima locations for each $d_i$, $\tau_j$, and $s_k$.
- The distance to each of the first three local maxima locations for each $d_i$, $\tau_j$, and $s_k$.

The differences between distances to the corresponding first three local maxima in each combination of two different directions $d_i$ for each $\tau_j$ and $s_k$.

In the above described implementation, approximately 64,000 features can be extracted for each candidate location. The self-aligning features are described in greater detail in United States Published Patent Application 2011/0222751, which is incorporated herein by reference. The fourth lesion detector classifies each voxel in the third set of bone lesion center candidates as positive (bone-lesion) or negative (non-bone lesion) based on the self-aligning features extracted at each voxel. The fourth set of bone lesion center candidates (i.e., the voxels classified as positive by the fourth lesion translation detector) is passed to the detector of step 310.

At step 310, bone lesion candidates are detected based on the fourth set of bone lesion center candidates with a lesion scale detector using 3D steerable features. In particular, for each one of the fourth set of bone lesion center candidates, multiple bone lesion hypotheses are generated. The bone lesion hypotheses are generated by creating bounding boxes having predetermined different scales for each center candidate. The different scales are representative of a range of sizes of lesion in the training data. The trained lesion scale detector determines a probability value for each of the bone lesion hypotheses based on steerable features extracted for the bone lesion hypotheses, and selects the bone lesion hypothesis with the highest probability score (over a certain threshold) for each center candidate in the fourth set of center candidates. Steerable features are features that are extracted at a sampling pattern place in an image, whose sampling steps are proportional to a scale of the object in each direction. Steerable features are described in greater detail in U.S. Pat. No. 7,916,919, which is incorporated herein by reference. The bone lesion candidates detected by the lesion scale detector are bounding boxes, each specifying a location of a bone lesion and a scale of the bone lesion along all three axes.

Returning to FIG. 1, at step 110, the detected bone lesion candidates in the current resolution pyramid image are clustered. The clustering combines bone lesion candidates that are positioned close together, as candidates close to each other are likely to represent the same lesion. According to an advantageous implementation, hierarchical agglomerative clustering, which is a well-known clustering algorithm, can be used to perform the clustering detected bone lesion candidates that are spatially close to each other (e.g., within a certain distance threshold). The clustering of the detected bone lesion candidates results in bone lesions detected in the current resolution pyramid image.

FIG. 4 illustrates exemplary bone lesion detection results obtained using cascade detection and clustering. As illustrated in FIG. 4, image (a) shows vertebrae 402 detected in the pre-processing step (step 104 of FIG. 4) to defined regions of interest. Image (b) shows a region of interest 404 corresponding to one of the detected vertebrae 402 in image (a). Image (c) shows a first set of bone lesion center candidates 406 detected using a first detector. Images (d) and (e) show second and third sets of bone lesion center candidates 408 and 410, respectively detected from the first set of bone lesion center candidates 406 using second and third detectors arranged in a bootstrapped detection cascade. Image (f) shows an exemplary bone lesion 412 after scale detection and clustering. It is to be understood that the steps shown in images (c)-(f) are iterated at each resolution pyramid level.

Returning to FIG. 1, at step 112, it is determined if the current resolution pyramid image is the final resolution pyramid image. If the current resolution pyramid image is not the final resolution pyramid image, the method proceeds to step 114. If the current resolution pyramid image is the final resolution pyramid image, the method proceeds to step 116. At step 114, the method proceeds to the next resolution pyramid image (i.e., a reduced resolution image of the current pyramid resolution image), and returns to step 108 to detect bone lesions in the next resolution pyramid image.

During detection, the cascade of detectors is applied to a resolution pyramid of the received 3D medical image volume equal to the resolution pyramid used for generating training samples. Separate detectors are trained for each resolution pyramid level using training data at the same resolution pyramid level.

At step 116, the detected lesions in the resolution pyramid images are integrated. In particular, the detected lesions in each of the reduced resolution pyramid images are mapped back to the original resolution image. This results in lesions having different scales being detected in the original resolution image. According to an exemplary embodiment, clustering may be used for incremental pyramid integration after each cascade iteration on the individual resolution pyramid levels.

At step 118, the bone lesion detection results are output. For example, the done lesion detection results can be output by displaying the detection results on a display device of a computer system. It is also possible to output the bone lesion detection results by storing the detection results on a memory or storage of a computer system. According to a possible embodiment, the bone lesion detection results can be output by outputting the bone lesion detection results to a segmentation algorithm, which can be used to exactly delineate the detected bone lesions.

Figure 5:
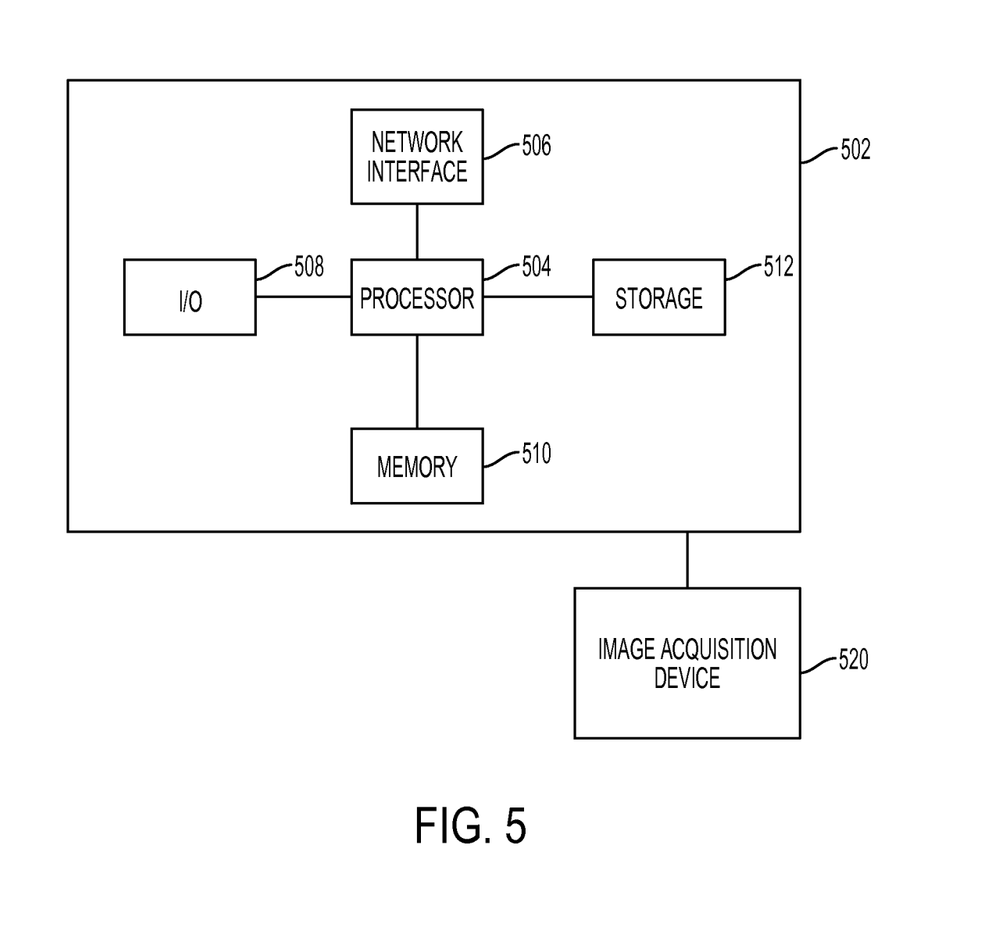
FIG. 5 is a high level block diagram of a computer capable of implementing the present invention.

The above-described methods for automatic bone lesion detection and volumetric quantification may be implemented on a computer using well-known computer processors, memory units, storage devices, computer software, and other components. A high level block diagram of such a computer is illustrated in FIG. 5. Computer 502 contains a processor 504 which controls the overall operation of the computer 502 by executing computer program instructions which define such operations. The computer program instructions may be stored in a storage device 512, or other computer readable medium (e.g., magnetic disk, CD ROM, etc.) and loaded into memory 510 when execution of the computer program instructions is desired. Thus, the steps of the method of FIGS. 1 and 3 may be defined by the computer program instructions stored in the memory 510 and/or storage 512 and controlled by the processor 504 executing the computer program instructions. An image acquisition device 520, such as a CT scanning device, can be connected to the computer 502 to input medical images to the computer 502. It is possible to implement the image acquisition device 520 and the computer 502 as one device. It is also possible that the image acquisition device 520 and the computer 502 communicate wirelessly through a network. The computer 502 also includes one or more network interfaces 506 for communicating with other devices via a network. The computer 502 also includes other input/output devices 508 that enable user interaction with the computer 502 (e.g., display, keyboard, mouse, speakers, buttons, etc.). One skilled in the art will recognize that an implementation of an actual computer could contain other components as well, and that FIG. 5 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

What is claimed is:

1. A method for automatic bone lesion detection in a 3D medical image, comprising:
   detecting one or more regions of interest corresponding to one or more bone regions in a 3D medical image; and
   detecting bone lesions in the one or more regions of interest using a cascade of trained detectors, wherein the step of detecting bone lesions in the one or more regions of interest using a cascade of trained detectors comprises:
      detecting bone lesions in the one or more regions of interest in each of a plurality of levels of a resolution pyramid of the 3D medical image using a respective cascade of trained detectors trained for each resolution pyramid level.

2. The method of claim 1, wherein the cascade of trained detectors comprises a plurality of detectors, each trained to detect bone lesions based on annotated training data using different features, and the cascade of detectors is trained using bootstrapping such that the first detector in the cascade is trained based on a complete set of annotated training data and subsequent detectors in the cascade are trained only based on samples classified as positive by a previous detector in the cascade.

3. The method of claim 1, wherein the step of detecting bone lesions in the one or more regions of interest using a cascade of trained detectors comprises:
   detecting bone lesion center candidates using at least one lesion translation detector; and
   detecting bone lesion candidates based on the bone lesion center candidates using a lesion scale detector.

4. The method of claim 3, wherein the step of detecting bone lesion center candidates using at least one lesion translation detector comprises:
   detecting the bone lesion center candidates using a plurality of lesion translation detectors to successively reduce a number of the bone lesion center candidates detected.

5. The method of claim 3, wherein the step of detecting bone lesion candidates based on the bone lesion center candidates using a lesion scale detector comprises:
   generating a plurality of bone lesion hypotheses for each of the detected bone lesion center candidates, wherein each bone lesion hypothesis is a 3D bounding box centered at the respective bone lesion center candidate; and
   determining, by the lesion scale detector, a probability score for each of the generated bone lesion hypotheses; and
   selecting a bone lesion hypothesis having a highest probability score over a threshold for each bone lesion center candidate.

6. The method of claim 5, wherein the step of generating a plurality of bone lesion hypotheses for each of the detected bone lesion center candidates comprises:
   generating a plurality of bounding boxes over a range of scales of bone lesions in annotated training data for each bone lesion center candidate.

7. The method of claim 3, wherein the step of detecting bone lesions in the one or more regions of interest using a cascade of trained detectors further comprises:
   clustering the bone lesion candidates to combine detected bone lesion candidates that are spatially close together.

8. The method of claim 7, wherein the step of clustering the bone lesion candidates to combine detected bone lesion candidates that are spatially close together comprises:
   clustering the bone lesion center candidates using hierarchical agglomerative clustering.

9. The method of claim 1, wherein the step of detecting bone lesions in the one or more regions of interest in each of a plurality of levels of a resolution pyramid of the 3D medical image comprises:
   generating a plurality of resolution pyramid images of the 3D medical image;
   successively detecting bone lesions in each of the plurality of resolution pyramid images by, for each resolution pyramid image:
      detecting bone lesion candidates in the resolution pyramid image using the respective cascade of trained detectors, and
      clustering the detected bone lesion candidates in the resolution pyramid image; and
   integrating the detected bone lesions in each of the plurality of resolution pyramid images to an original resolution of the 3D medical image.

10. The method of claim 1, wherein the step of detecting bone lesions in the one or more regions of interest using a cascade of trained detectors comprises:
   (a) detecting a first set of bone lesion center candidates from voxels in the one or more regions of interest by a first lesion translation detector using coarse 3D Haar-like features;
   (b) detecting a second set of bone lesion center candidates from the first set of bone lesion center candidates by a second lesion translation detector using objectness features;
   (c) detecting a third set of bone lesion center candidates from the second set of bone lesion center candidates by a third lesion translation detector using fine 3D Haar-like features;
   (d) detecting a fourth set of bone lesion center candidates from the third set of bone lesion center candidates by a fourth lesion translation detector using self-aligning features that self-align to high gradients; and
   (e) detecting bone lesion candidates based on the fourth set of lesion center candidates by a lesion scale detector using steerable features, wherein each bone lesion center candidate is a bounding box centered at a voxel in the fourth set of lesion center candidates.

11. The method of claim 10, wherein the step of detecting bone lesions in the one or more regions of interest using a cascade of trained detectors further comprises:
   (f) clustering the detected bone lesion candidates to combine detected bone lesion candidates that are spatially close together.

12. The method of claim 11, wherein the step of detecting bone lesions in the one or more regions of interest using a cascade of trained detectors further comprises:
   (g) repeating steps (a)-(f) for each of the plurality of levels of the resolution pyramid of the 3D medical image.

13. The method of claim 1, wherein the step of detecting one or more regions of interest corresponding to one or more bone regions in a 3D medical image comprises:
   detecting a plurality of regions of interest corresponding to vertebrae in the 3D medical image.

14. The method of claim 13, wherein the step of detecting bone lesions in the one or more regions of interest using a cascade of trained detectors further comprises:

detecting spinal bone lesions in each of the plurality of regions of interest corresponding to the vertebrae in the 3D medical image.

15. An apparatus for automatic bone lesion detection in a 3D medical image, comprising:
   means for detecting one or more regions of interest corresponding to one or more bone regions in a 3D medical image; and
   means for detecting bone lesions in the one or more regions of interest using a cascade of trained detectors, wherein the means for detecting bone lesions in the one or more regions of interest using a cascade of trained detectors comprises:
      means for detecting bone lesions in the one or more regions of interest in each of a plurality of levels of a resolution pyramid of the 3D medical image using a respective cascade of trained detectors trained for each resolution pyramid level.

16. The apparatus of claim 15, wherein the means for detecting bone lesions in the one or more regions of interest using a cascade of trained detectors comprises:
   means for detecting bone lesion center candidates using at least one lesion translation detector; and
   means for detecting bone lesion candidates based on the bone lesion center candidates using a lesion scale detector.

17. The apparatus of claim 15, wherein the means for detecting bone lesions in the one or more regions of interest using a cascade of trained detectors further comprises:
   means for clustering the bone lesion candidates to combine detected bone lesion candidates that are spatially close together.

18. The apparatus of claim 15, wherein the means for detecting bone lesions in the one or more regions of interest in each of a plurality of levels of a resolution pyramid of the 3D medical image comprises:
   means for generating a plurality of resolution pyramid images of the 3D medical image;
   means for successively detecting bone lesions in each of the plurality of resolution pyramid images comprising:
      means for detecting bone lesion candidates in each resolution pyramid image using the respective cascade of trained detectors, and
      means for clustering the detected bone lesion candidates in each resolution pyramid image; and
   means for integrating the detected bone lesions in each of the plurality of resolution pyramid images to an original resolution of the 3D medical image.

19. The apparatus of claim 15, wherein the means for detecting bone lesions in the one or more regions of interest using a cascade of trained detectors comprises:
   means for detecting a first set of bone lesion center candidates from voxels in the one or more regions of interest by a first lesion translation detector using coarse 3D Haar-like features;
   means for detecting a second set of bone lesion center candidates from the first set of bone lesion center candidates by a second lesion translation detector using objectness features;
   means for detecting a third set of bone lesion center candidates from the second set of bone lesion center candidates by a third lesion translation detector using fine 3D Haar-like features;
   means for detecting a fourth set of bone lesion center candidates from the third set of bone lesion center candidates by a fourth lesion translation detector using self-aligning features that self-align to high gradients; and
   means for detecting bone lesion candidates based on the fourth set of lesion center candidates by a lesion scale detector using steerable features, wherein each bone lesion center candidate is a bounding box centered at a voxel in the fourth set of lesion center candidates.

20. The apparatus of claim 19, wherein the means for detecting bone lesions in the one or more regions of interest using a cascade of trained detectors further comprises:
   means for clustering the detected bone lesion candidates to combine detected bone lesion candidates that are spatially close together.

21. The apparatus of claim 15, wherein the means for detecting one or more regions of interest corresponding to one or more bone regions in a 3D medical image comprises:
   means for detecting a plurality of regions of interest corresponding to vertebrae in the 3D medical image.

22. The apparatus of claim 21, wherein the means for detecting bone lesions in the one or more regions of interest using a cascade of trained detectors further comprises:
   means for detecting spinal bone lesions in each of the plurality of regions of interest corresponding to the vertebrae in the 3D medical image.

23. A non-transitory computer readable medium encoded with computer executable instructions for automatic detection of bone lesions in a 3D medical image, the computer executable instructions defining a method comprising:
   detecting one or more regions of interest corresponding to one or more bone regions in a 3D medical image; and
   detecting bone lesions in the one or more regions of interest using a cascade of trained detectors, wherein the step of detecting bone lesions in the one or more regions of interest using a cascade of trained detectors comprises:
      detecting bone lesions in the one or more regions of interest in each of a plurality of levels of a resolution pyramid of the 3D medical image using a respective cascade of trained detectors trained for each resolution pyramid level.

24. The non-transitory computer readable medium of claim 23, wherein the step of detecting bone lesions in the one or more regions of interest using a cascade of trained detectors comprises:
   detecting bone lesion center candidates using at least one lesion translation detector; and
   detecting bone lesion candidates based on the bone lesion center candidates using a lesion scale detector.

25. The non-transitory computer readable medium of claim 24, wherein the step of detecting bone lesion candidates based on the bone lesion center candidates using a lesion scale detector comprises:
   generating a plurality of bone lesion hypotheses for each of the detected bone lesion center candidates, wherein each bone lesion hypothesis is a 3D bounding box centered at the respective bone lesion center candidate; and
   determining, by the lesion scale detector, a probability score for each of the generated bone lesion hypotheses; and
   selecting a bone lesion hypothesis having a highest probability score over a threshold for each bone lesion center candidate.

26. The non-transitory computer readable medium of claim 24, wherein the step of detecting bone lesions in the one or more regions of interest using a cascade of trained detectors further comprises:
   clustering the bone lesion candidates to combine detected bone lesion candidates that are spatially close together.

27. The non-transitory computer readable medium of claim 23, wherein the step of detecting bone lesions in the one or more regions of interest in each of a plurality of levels of a resolution pyramid of the 3D medical image comprises:
generating a plurality of resolution pyramid images of the 3D medical image;
successively detecting bone lesions in each of the plurality of resolution pyramid images by, for each resolution pyramid image:
detecting bone lesion candidates in the resolution pyramid image using the respective cascade of trained detectors, and
clustering the detected bone lesion candidates in the resolution pyramid image; and
integrating the detected bone lesions in each of the plurality of resolution pyramid images to an original resolution of the 3D medical image.

28. The non-transitory computer readable medium of claim 23, wherein the step of detecting bone lesions in the one or more regions of interest using a cascade of trained detectors comprises:
(a) detecting a first set of bone lesion center candidates from voxels in the one or more regions of interest by a first lesion translation detector using coarse 3D Haar-like features;
(b) detecting a second set of bone lesion center candidates from the first set of bone lesion center candidates by a second lesion translation detector using objectness features;
(c) detecting a third set of bone lesion center candidates from the second set of bone lesion center candidates by a third lesion translation detector using fine 3D Haar-like features;
(d) detecting a fourth set of bone lesion center candidates from the third set of bone lesion center candidates by a fourth lesion translation detector using self-aligning features that self-align to high gradients; and
(e) detecting bone lesion candidates based on the fourth set of lesion center candidates by a lesion scale detector using steerable features, wherein each bone lesion center candidate is a bounding box centered at a voxel in the fourth set of lesion center candidates.

29. The non-transitory computer readable medium of claim 28, wherein the step of detecting bone lesions in the one or more regions of interest using a cascade of trained detectors further comprises:
(f) clustering the detected bone lesion candidates to combine detected bone lesion candidates that are spatially close together.

30. The non-transitory computer readable medium of claim 29, wherein the step of detecting bone lesions in the one or more regions of interest using a cascade of trained detectors further comprises:
(g) repeating steps (a)-(f) for each of the plurality of levels of the resolution pyramid of the 3D medical image.

31. The non-transitory computer readable medium of claim 23, wherein the step of detecting one or more regions of interest corresponding to one or more bone regions in a 3D medical image comprises:
detecting a plurality of regions of interest corresponding to vertebrae in the 3D medical image.

32. The non-transitory computer readable medium of claim 31, wherein the step of detecting bone lesions in the one or more regions of interest using a cascade of trained detectors further comprises:
detecting spinal bone lesions in each of the plurality of regions of interest corresponding to the vertebrae in the 3D medical image.

\* \* \* \* \*